US010055169B2

(12) United States Patent
Kim et al.

(10) Patent No.: US 10,055,169 B2
(45) Date of Patent: Aug. 21, 2018

(54) MEMORY SYSTEM AND READ REQUEST MANAGEMENT METHOD THEREOF

(71) Applicant: SAMSUNG ELECTRONICS CO., LTD., Suwon-si, Gyenggi-Do (KR)

(72) Inventors: Dong-Uk Kim, Seoul (KR); Hanjoon Kim, Namyangju-si (KR); Duckjoo Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 57 days.

(21) Appl. No.: 15/215,072

(22) Filed: Jul. 20, 2016

(65) Prior Publication Data

US 2017/0123727 A1 May 4, 2017

(30) Foreign Application Priority Data

Oct. 30, 2015 (KR) .......................... 10-2015-0151940

(51) Int. Cl.
*G06F 3/06* (2006.01)
(52) U.S. Cl.
CPC ............ *G06F 3/0659* (2013.01); *G06F 3/061* (2013.01); *G06F 3/0611* (2013.01); *G06F 3/0661* (2013.01); *G06F 3/0673* (2013.01); *G06F 3/0685* (2013.01)
(58) Field of Classification Search
None
See application file for complete search history.

(56) References Cited

U.S. PATENT DOCUMENTS

| 5,363,486 A | 11/1994 | Olson et al. |
| 5,809,514 A * | 9/1998 | Nasserbakht ....... G06F 12/0879 711/100 |
| 6,321,310 B1 * | 11/2001 | McCarthy ............... G06F 13/28 710/20 |
| 6,470,415 B1 | 10/2002 | Starr et al. |
| 6,629,226 B1 | 9/2003 | Paul et al. |
| 6,868,087 B1 | 3/2005 | Agarwala et al. |
| 7,159,084 B1 * | 1/2007 | Dhanoa ............... G06F 13/1631 711/158 |
| 7,899,957 B1 * | 3/2011 | Dhanoa ............... G06F 13/1673 710/22 |
| 8,472,457 B2 | 6/2013 | Spencer |
| 8,489,851 B2 | 7/2013 | Vamanan et al. |
| 8,527,998 B2 | 9/2013 | Cho et al. |
| 8,767,772 B2 | 7/2014 | Masputra et al. |
| 9,703,731 B2 * | 7/2017 | Okada ................. G06F 13/1605 |
| 2006/0047874 A1 * | 3/2006 | Watanabe ........... G06F 13/1642 710/244 |
| 2006/0136682 A1 * | 6/2006 | Haridas .................... G11C 7/20 711/154 |
| 2011/0131385 A1 * | 6/2011 | Henriksson ......... G06F 13/1642 711/158 |

(Continued)

*Primary Examiner* — Kevin Verbrugge
(74) *Attorney, Agent, or Firm* — Volentine, Whitt & Francos, PLLC (57) ABSTRACT

A memory system includes a plurality of memory devices and a memory controller configured to control the memory devices. The memory controller receives a read request having a variable size, generates at least one memory request having a fixed size in response to the read request, and transmits the at least one memory request to at least one of the memory devices.

16 Claims, 6 Drawing Sheets

(56) References Cited

U.S. PATENT DOCUMENTS

| | | | |
|---|---|---|---|
| 2013/0054896 A1* | 2/2013 | Colavin | G06F 12/084 711/118 |
| 2013/0290971 A1 | 10/2013 | Chen et al. | |
| 2016/0004477 A1* | 1/2016 | Okada | G06F 5/12 710/4 |

* cited by examiner

MEMORY SYSTEM AND READ REQUEST MANAGEMENT METHOD THEREOF

CROSS-REFERENCE TO RELATED APPLICATION

A claim of priority under 35 U.S.C. § 119 is made to Korean Patent Application No. 10-2015-0151940, filed on Oct. 30, 2015, the entire contents of which are hereby incorporated by reference.

BACKGROUND

The inventive concepts described herein relate to memory systems and variable-sized read request management methods thereof.

A data center typically includes an application server configured to process a user request, a data server configured to store data according to control of the application server, and a cache server configured to provide a cache function. Due to the need for high operating speed, the cache server may be configured based on dynamic random access memory (DRAM). When the application server transmits a key to the cache server, the cache server may search a value corresponding to the key and provide the searched value to the application server.

SUMMARY

The present disclosure relates to a memory system that optimally processes a request of a variable size and a corresponding request processing method of the memory system.

Embodiments of the inventive concept provide a memory system including a plurality of memory devices and a memory controller configured to control the plurality of memory devices. The memory controller is configured to receive a read request having a variable size, generate at least one memory request having a fixed size in response to the read request, and transmit the at least one memory request to at least one of the memory devices.

In example embodiments, the memory controller may include a read queue configured to store the read request and a size of the read request.

In example embodiments, the memory controller may further include a request size calculator configured to calculate the size of the read request using the fixed size.

In example embodiments, the read queue may include a plurality of request queue units, and the memory controller may further include a scheduler configured to decide a read request to be processed among read requests stored in the request queue units.

In example embodiments, the memory controller may further include a memory request generator configured to generate memory requests using a read request stored in a selected request queue unit from the scheduler and a corresponding size.

In example embodiments, the memory controller may include a read queue having a plurality of request queue units configured to store the read request, and the request queue units may be divided into a plurality of regions according to a size of the read request.

In example embodiments, the request queue units may include a first size region having first request queue units, and a second size region having second request queue units. A size of each of the second request queue units may be greater than a size of each of the first request queue units.

In example embodiments, the memory controller may further include an address splitter configured to receive the read request and split an address of the read request into a plurality of addresses responsive to size information of the read request. The split addresses may be stored in a corresponding request queue unit among the second request queue units.

In example embodiments, the memory controller may further include a request size calculator configured to receive the read request and calculate the size of the read request using the fixed size.

In example embodiments, the memory controller may further include a scheduler configured to decide a read request to be processed among read requests stored in the request queue units. The scheduler may be configured to decide a read request to be processed according to a score value accumulated in each of the request queue units.

In example embodiments, the scheduler may be configured to select a corresponding request queue unit when the score value is greater than a predetermined value.

In example embodiments, the scheduler may be configured to select a request queue unit considering waiting time of each of the request queue units.

In example embodiments, the memory system may be a key-value store, and the scheduler may be configured to decide priority according to a key and a value, and select a request queue unit using the priority.

In example embodiments, the scheduler may be configured to select the request queue unit using a size of a request queue unit.

In example embodiments, the memory controller may include a memory request generator configured to generate the at least one memory request, output a count value corresponding to a size of the read request, generate a memory address using a start address of the read request and a burst size of each of the memory devices.

In example embodiments, the memory request generator may be configured to determine whether a read request is the last memory request, based on the count value In example embodiments, the memory request generator may be configured to stop generating the memory address and generate a memory address for a new read request under a predetermined condition.

Embodiments of the inventive concept provide a memory controller including a request size calculator configured to receive read requests and calculate a size of the read requests; a read queue including a plurality of request queue units configured to store the read requests; a scheduler configured to read information on the stored read requests from the read queue and select a processing sequence of the request queue units based on the read information; and a memory request generator configured to generate at least one memory request to a memory responsive to the processing sequence of the request queue units.

In example embodiments, the read queue includes first request queue units configured to store read requests of a first size, and second request queue units configured to store read requests of a second size greater than the first size.

In example embodiments, the read request includes a start address. The memory controller may further include an address splitter configured to split a single read request into first and second split read requests, and to store a start address of the first split read request in one of the first request queue units and a start address of the second split read request in one of the second request queue units.

In example embodiments, the request size calculator may be further configured to store the size of the read requests in the request queue units.

Example embodiments of the inventive concept provide a memory controller including a request size calculator configured to read a read request having a variable size and calculate a size of the read request, an address splitter configured to split an address of the read request according to the calculated size, a read queue including a first size region having first request queue units and a second size region having second request queue units, a scheduler configured to select whether or not to process a corresponding read request based on read request information read from the first request queue units or the second request queue units, and a memory request generator configured to generate at least one memory request suitable for a memory device in response to read request information of a request queue unit selected from the scheduler. Read request information of a first size may be stored in each of the first request queue units, and read request information of a second size may be stored in each of the second request queue units. The second size may be greater than the first size.

In example embodiments, the memory request generator may be configured to calculate the number of memory requests from read request information stored in each of the first and second request queue units and store a count value corresponding to the calculated memory request.

In example embodiments, the count value may be transmitted to the memory device.

Example embodiments of the inventive concept provide a read request management method of a memory system including receiving a read request, calculating a size of the read request, deciding a processing sequence of the read request using the calculated size and waiting time, and generating at least one memory request corresponding to the read request using the calculated size.

Example embodiments of the inventive concept further provide a memory system including a plurality of memory devices; and a memory controller configured to receive read requests, calculate sizes of the read requests, decide a processing sequence of the read requests using the calculated sizes and waiting times, and generate at least one memory request to at least one of the plurality of memory devices responsive to the read requests using the calculated sizes.

In example embodiments, the read requests have variable size.

BRIEF DESCRIPTION OF THE DRAWINGS

The forgoing and other features of inventive concepts will be described below in more detail with reference to the accompanying drawings of non-limiting embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Example embodiments of the inventive concepts will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions may be exaggerated for clarity. Like reference characters and/or numerals in the drawings denote like elements, and thus their description may be omitted.

It should be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
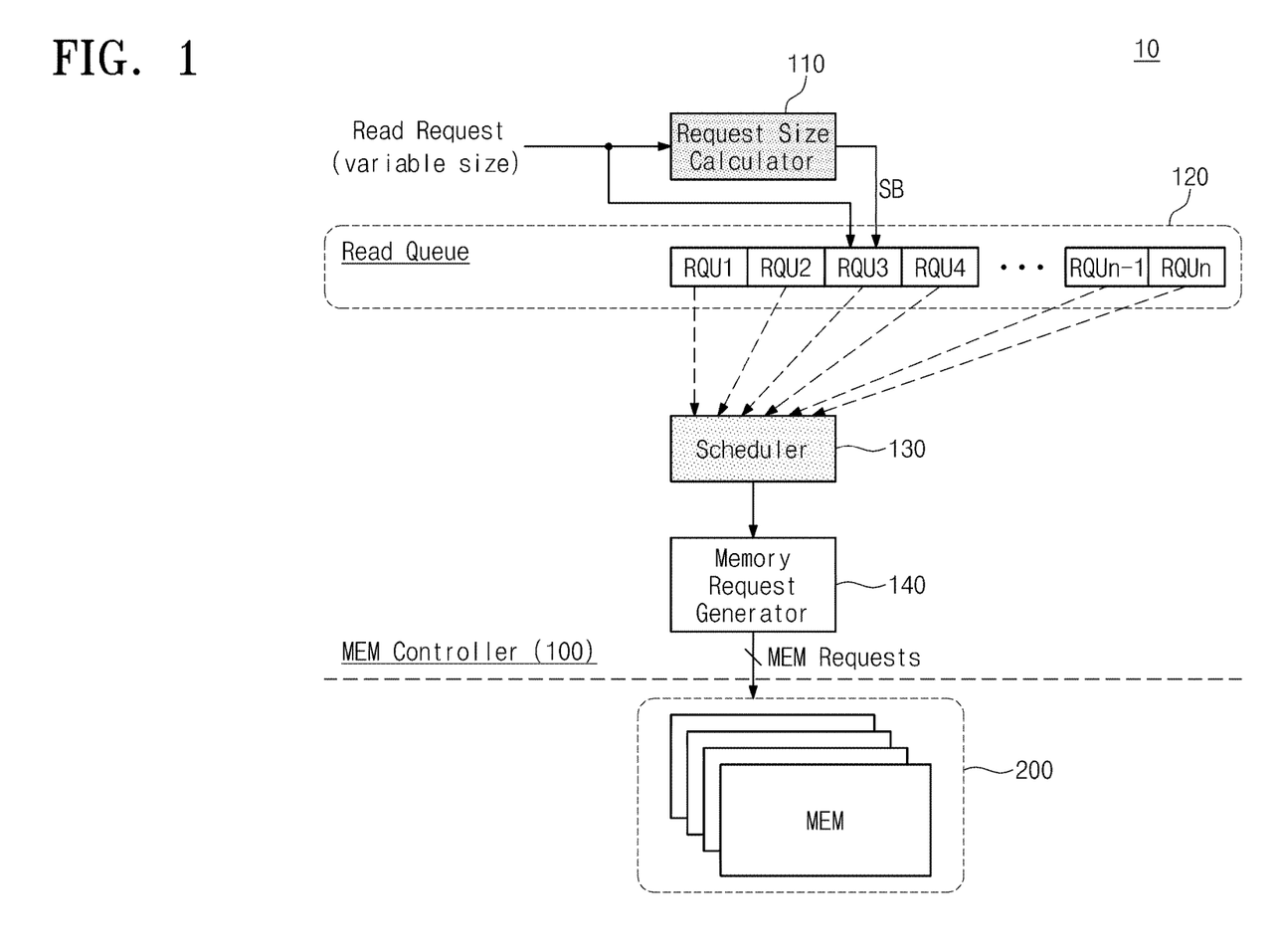
FIG. 1 illustrates a memory system according to example embodiments of inventive concepts.

FIG. 1 illustrates a memory system 10 according to example embodiments of inventive concepts. As illustrated, the memory system 10 includes a memory controller 100 and at least one memory device (MEM) 200.

The memory controller 100 includes a request size calculator 110, a read queue 120, a scheduler 130, and a memory request generator 140.

The request size calculator 110 may be configured to calculate a size of a read request. For example, the request size calculator 110 may generate size bit(s) SB corresponding to a value obtained by dividing the size of the read request by a size of a memory request. That is, the size bit(s) SB may be a value corresponding to the number of memory requests corresponding to an input read request. The memory request may be generated from the memory request generator 140. In example embodiments, the size of the read request may have a variable size. That is, the size of the read request is variable.

The read queue 120 may include a plurality of request queue units RQU1 to RQUn (n being an integer greater than or equal to 2) to store the read request and the size bit(s) SB. In example embodiments, the read request may include a start address to start a read operation.

The scheduler 130 may be configured to read information on the read request from the read queue 120, select one of the request queue units RQU1 to RQUn according to a predetermined algorithm, and output read request information corresponding to a selected request queue. The predetermined algorithm may decide the priority of the request queue units RQU1 to RQUn. That is, the predetermined algorithm may decide the processing sequence of the request queue units RQU1 to RQUn.

The memory request generator 140 may be configured to receive the read request information of the selected request queue unit from the scheduler 130 and generate at least one memory request. In example embodiments, a size of the memory request may be a fixed value. For example, the size of the memory request may be 64 bytes (or 72 bytes). However, the size of the memory request need not be limited thereto. The size of the memory request may be variable.

The at least one memory device 200 may be configured to perform a read operation in response to a memory request output from the memory controller 100. In example embodiments, the memory device 200 may be implemented with a volatile memory device (e.g., dynamic random access memory (DRAM), static random access memory (SRAM) or the like). In example embodiments, the memory device 200 may be implemented with a nonvolatile memory device (e.g., phase-change random access memory (PRAM), NAND flash memory, NOR flash memory or the like). In example embodiments, the memory device 200 may be a hybrid memory device (e.g., nonvolatile dual in-line memory module (NVDIMM) or the like) of a volatile memory device and a nonvolatile memory device.

In FIG. 1, a size bit(s) SB of a read request is stored in a request queue unit (e.g., RQU1 to RQUn). However, example embodiments of inventive concepts are not limited thereto. A memory system according to example embodiments of inventive concepts may be configured to store a read request in a separated/selected request queue unit according to a size of the read request.

Figure 2:
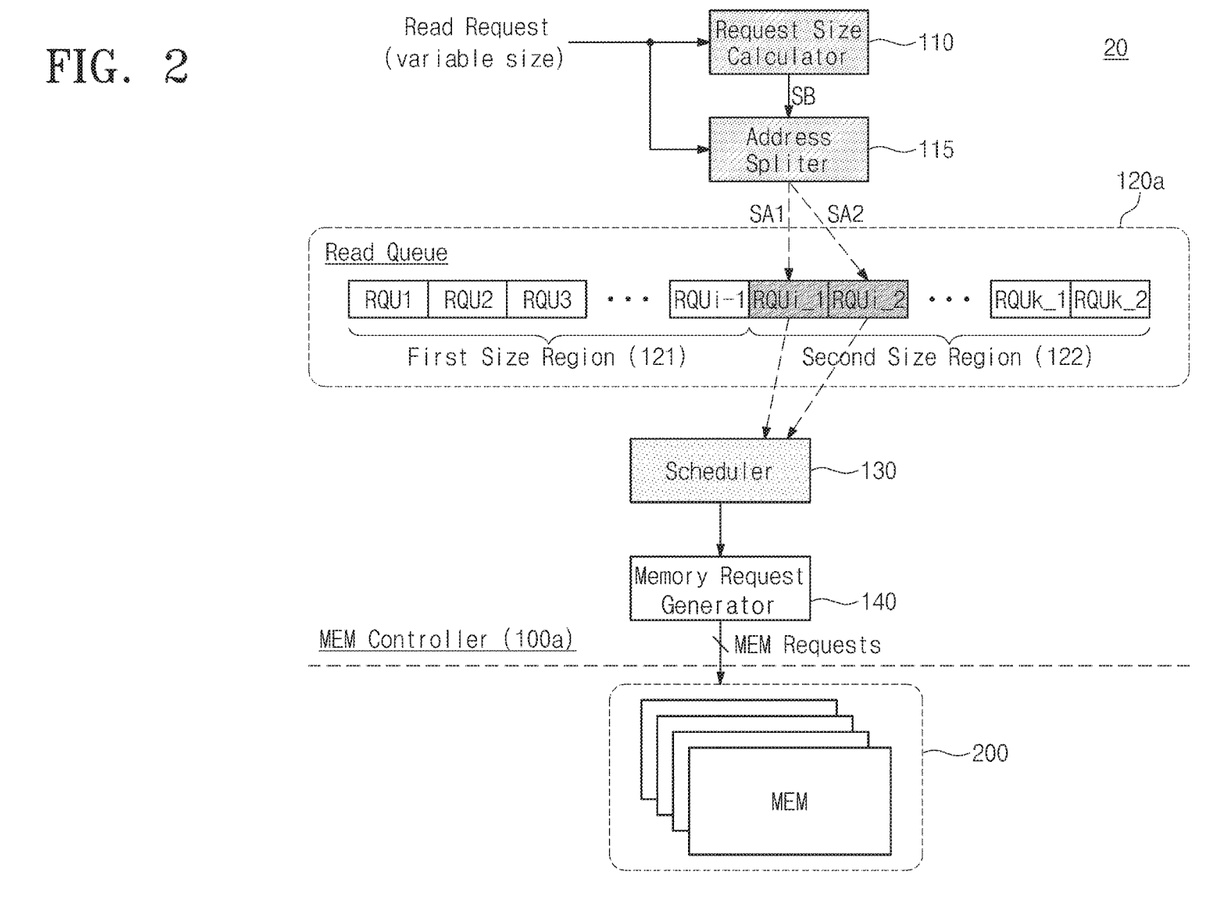
FIG. 2 illustrates a memory system according to example embodiments of inventive concepts.

FIG. 2 illustrates a memory system 20 according to further example embodiments of inventive concepts. As compared to the memory system 10 in FIG. 1, the memory system 20 in FIG. 2 includes a memory controller 100a configured to separate request queue units (e.g., 121 and 122) that do not store size bit(s) SB in a read queue 120a and that however store a read request according to size bit(s) SB of the read request.

For example, as shown in FIG. 2, the read queue 120a may be configured to include request queue units RQU1 to RQUi−1 (i being an integer greater than or equal to 3) of a first size region 121 and request queue units RQUi_1, RQUi_2, ..., RQUk_1, and RQUk_k (k being an integer greater than i) of a second size region 122. The read queue 120a shown in FIG. 2 is separated into two size regions 121 and 122 according to size bit(s) SB. A request queue according to example embodiments may be separated into three or more size regions according to size bit(s) SB of the read request.

The read queue 120a may split a single read request into a plurality of read requests according to size bit(s) SB and store the split read requests. For example, a read request of 64 bytes may be stored in the first size region 121 and a read request of 256 bytes may be stored in the second size region 122. In other words, the read queue 120a may vary width/depth of a request queue unit according to size bit(s) SB.

An address splitter 115 may receive a read request and size bit(s) SB and generate addresses SA1 an SA2 according to the size bit(s) SB. That is, the address splitter 115 may split a start address of a read request into at least one start address according to the size bit(s) SB. For example, when the size bit(s) SB is equal to a size of a memory request, the address splitter 115 may output the start address as it is. Meanwhile, when the size bit(s) SB is greater than a size of a memory request, the address splitter 115 may split the start address into at least two start addresses.

Figure 3:
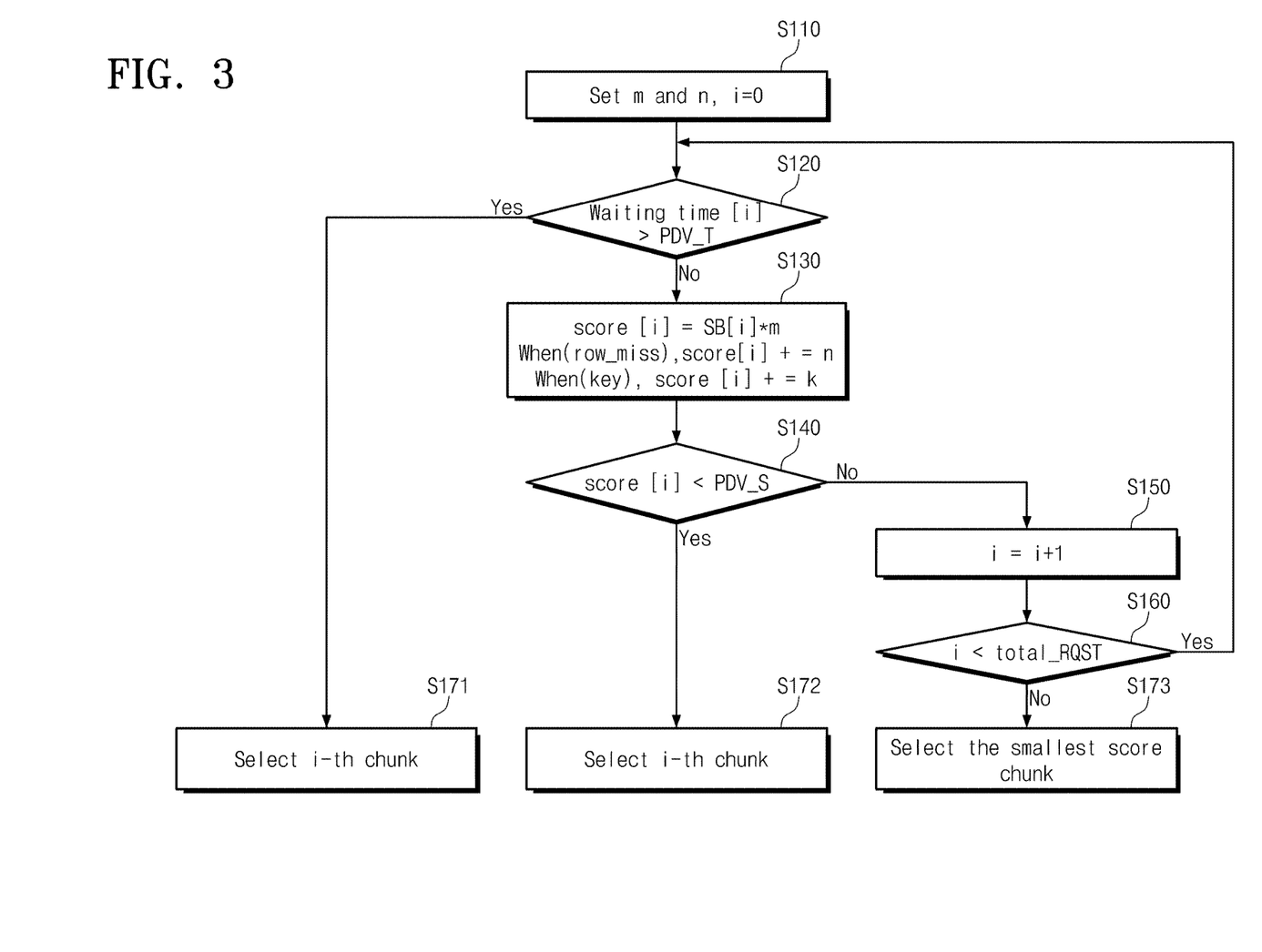
FIG. 3 illustrates a flowchart summarizing operation of a scheduler according to example embodiments of inventive concepts.

FIG. 3 illustrates a flowchart summarizing operation of a scheduler according to example embodiments of inventive concepts. The operation of the scheduler 130 will now be described below with reference to FIGS. 1 to 3.

First, m and n may be set and i may be set to zero (0), wherein i may be a chunk number corresponding to a queue unit (RQU) (S110). A determination may be made as to whether waiting time time[i] of an $i^{th}$ request queue unit (RQUi) is greater than predetermined time PDV_T (S120). When the waiting time time[i] is determined greater than the predetermined time PDV_T (S120), an $i^{th}$ chunk from the corresponding request queue unit RQUi may be selected (S171). The waiting time time [i] is a waiting time of the $i^{th}$ request unit RQUi. In example embodiments, a count value corresponding to the waiting time may be stored in a read queue.

Meanwhile, when the waiting time time[i] is determined to not be greater than the predetermined time PDV_T (S120), a value obtained by multiplying m by a size bit SB

[i] of the $i^{th}$ chunk may be an $i^{th}$ score score[i]. When a row miss exists, an n-added value may be the $i^{th}$ score score[i]. When the read request includes a key, a k-added value may be the $i^{th}$ score score[i] (k being a size value of the key). In example embodiments, the scheduler 130 may decide priority according to a key and a value and a request queue unit may be selected using the decided priority. In example embodiments, the scheduler 130 may select a request queue unit using a size of the request queue unit.

A determination is then made as to whether the $i^{th}$ score score[i] is smaller than a predetermined value PDV_S (S140). When the score score[i] is smaller than the predetermined value PDV_S, an $i^{th}$ chunk may be selected (S172). When the score score[i] is not smaller than the predetermined value PDV_S, the value I may be incremented as "i+1" to provide a new score [i] (S150).

A determination is then made as to whether the new i as incremented in step S150 is smaller than the total number of request queue units total_RQST (S160). When the new i is smaller than the total number of request queue units total_RQST, the flow returns to S120. When the new i is not smaller than the total number of request queue units total_RQST, a chunk having the smallest score may be selected (S173).

It should be understood that the scheduling algorithm of the scheduler 130 shown in FIG. 3 is merely exemplary and does not limit example embodiments of inventive concepts. A scheduling algorithm according to example embodiments of inventive concepts may be implemented using various methods.

Figure 4:
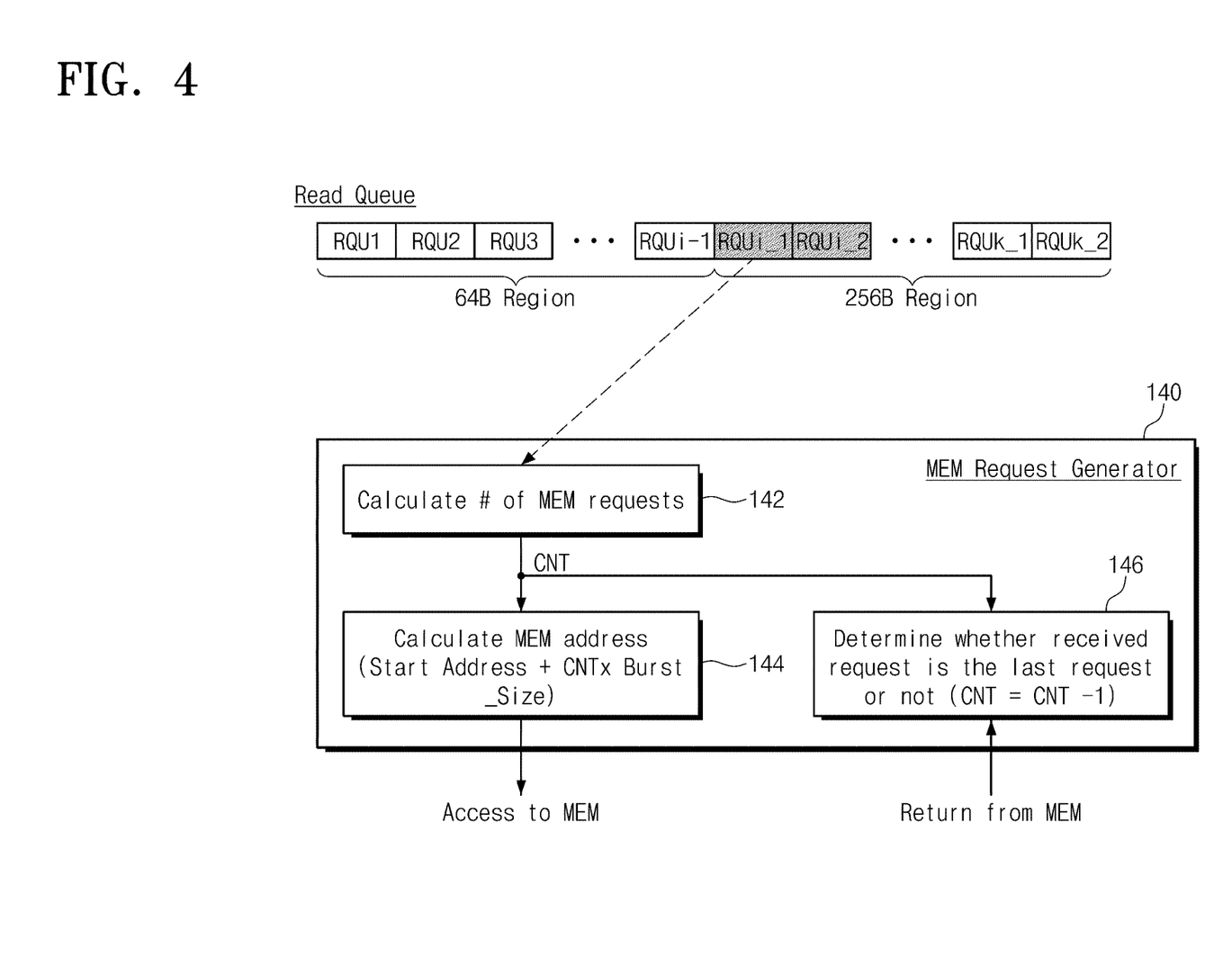
FIG. 4 illustrates operation of a memory request generator according to example embodiments of inventive concepts.

FIG. 4 illustrates operation of a memory request generator 140 according to further example embodiments of inventive concepts. The operation of the memory request generator 140 will now be described below with reference to FIGS. 1 to 4.

Since a memory device 200 (see FIG. 1) may read data by a burst size, the memory request generator 140 may consider this fact when transmitting a read command to the memory device 200. The memory request generator 140 may calculate the number of memory requests as depicted at 142 of memory request generator 140 shown in FIG. 4 and transmit a read command to the memory device 200 using a start address and the calculated number of memory requests, i.e., a count value CNT. The read command may include a memory address to perform a read operation. The memory address may be generated considering a burst size.

For brevity of description, an example will be described where a size of a memory request is 64 bytes and a read request is stored in a request queue unit in a 64-byte region or a request queue unit in a 256-byte region. If the read request is stored in the 256-byte region, the number of memory requests, i.e., a count value CNT is 4.

In example embodiments, the memory request generator 140 may further include a register to store the count value CNT.

The memory request generator 140 may generate and transmit a first read command to the memory device 200 to read data of the start address. After the passage of predetermined time, the memory request generator 140 may generate and transmit a second read command to the memory device 200 to read data corresponding to an address obtained by adding a burst size to the start address. Similarly, the memory generator 140 may transmit a third read command and a fourth read command to the memory device 200. Calculation and generation of the second, third and fourth read commands are depicted at 144 of memory request generator 140 shown in FIG. 4.

The memory request generator 140 may determine whether a read request input as the count value CNT is the last memory request. For example, if the count value CNT is 1, the read request is the last memory request. This is depicted at 146 of memory request generator 140 shown in FIG. 4. When the read data is transmitted from the memory device 200 in response to the read command, the memory request generator 140 may decrease the count value CNT by 1.

In addition, the memory request generator 140 may stop a memory address generating operation under a predetermined condition (situation) and generate a memory request for a new read request. For example, when a start address is 0, a count value is 16, and a burst size is 64 bytes, the memory request generator 140 may generate and transmit four memory requests and then generates a memory request for a new read request when it is determined that a memory request had not better be transmitted in a specific situation. In the case of the new read request, a start address may be 256 and a count value may be 12.

In FIGS. 1 to 4, the memory controller 100/100a is implemented to generate a memory request suitable for the memory device 200 in response to a read request having a variable size. However, example embodiments of inventive concepts need not be limited thereto. A memory device according to example embodiments of inventive concepts may be implemented to process not only a read request of a fixed size input from a memory controller but also a read request having a variable size.

Figure 5:
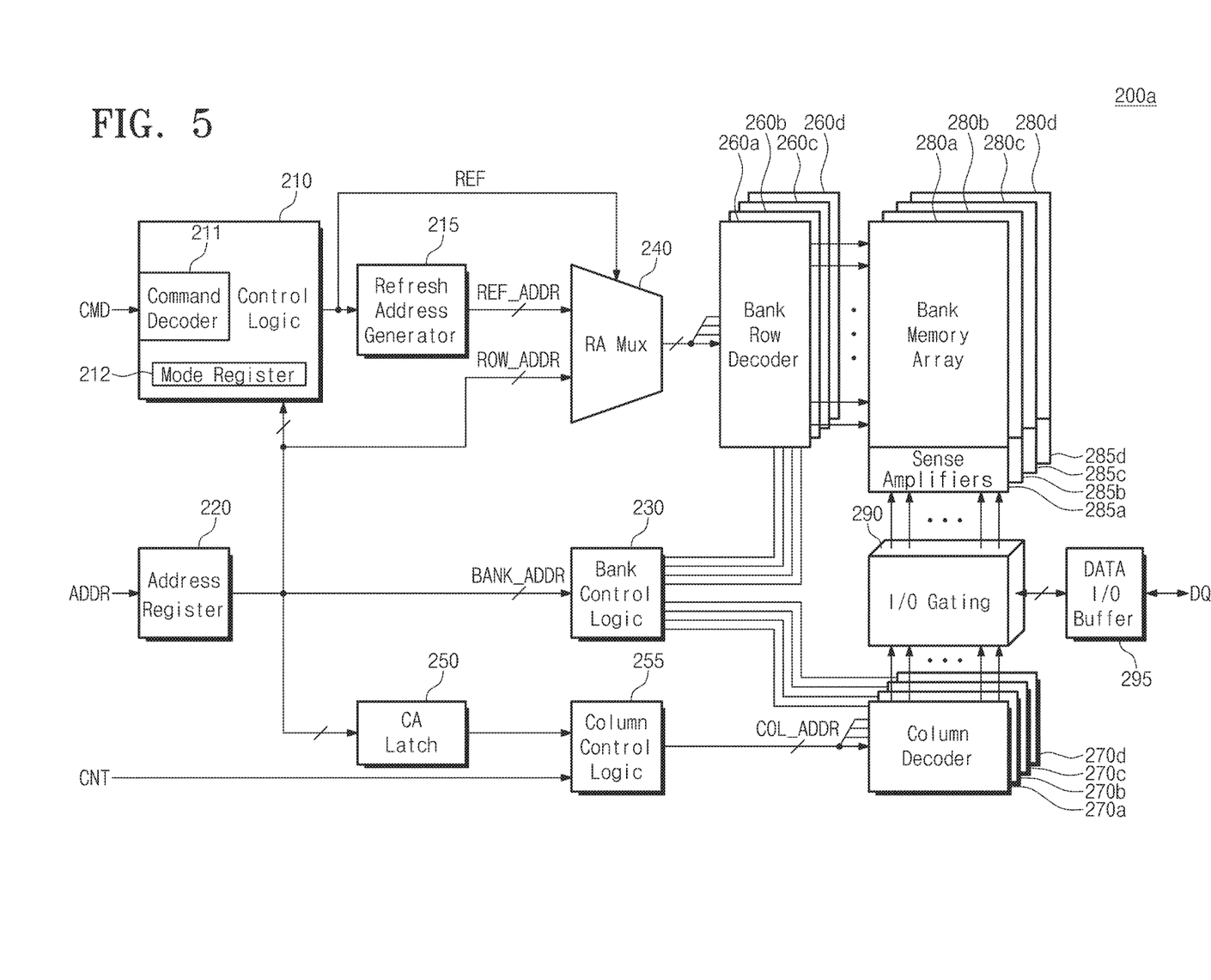
FIG. 5 illustrates a memory device according to example embodiments of inventive concepts.

FIG. 5 illustrates a memory device 200a according to example embodiments of inventive concepts. As illustrated, the memory device 200a includes a control logic 210, an address register 220, a bank control logic 230, a row address multiplexer 240, a column address latch 250, a row decoder, a column decoder, a memory cell array, a sense amplifier unit, an input/output (I/O) gating circuit 290, a data I/O buffer 295, and a refresh address generator 215.

The memory cell array includes for example first to fourth bank memory arrays 280a, 280b, 280c, and 280d. The row decoder includes for example first to fourth bank row decoders 260a, 260b, 260c, and 260d that are connected to the first to fourth bank memory arrays 280a, 280b, 280c, and 280d, respectively. The column decoder includes for example first to fourth bank column decoders 270a, 270b, 270c, and 270d that are connected to the first to fourth bank memory arrays 280a, 280b, 280c, and 280d, respectively, through the I/O gating circuit 290. The sense amplifier unit includes for example first to fourth bank sense amplifiers 285a, 285b, 285c, and 285d that are connected to the first to fourth bank memory arrays 280a, 280b, 280c, and 280d, respectively, through. The first to fourth bank memory arrays 280a, 280b, 280c, and 280d, the first to fourth bank sense amplifiers 285a, 285b, 285c, and 285d, the first to fourth bank row decoders 260a, 260b, 260c, and 260d, and the first to fourth bank column decoders 270a, 270b, 270c, and 270d may constitute first to fourth banks, respectively.

In FIG. 5, an example of the memory device 200a including four banks is shown. In some embodiments, the memory device 200a may include an arbitrary number of banks.

In some embodiments, the memory device 200a may be for example a dynamic random access memory (DRAM) such as a double data rate synchronous dynamic random access memory (DDR SDRAM), a low power double data rate SDRAM (LPDDR SDRAM), a graphics double data rate SDRAM (GDDR SDRAM) or any memory device that requires a refresh operation.

The address register 220 may receive an address ADDR including a bank address BANK_ADDR, a row address ROW_ADDR, and a column address COL_ADDR from the memory controller 100. The address register 220 may provide the received bank address BANK_ADDR to the bank control logic 230, provide the received row address ROW_ADDR to the row address multiplexer 240, and provide the received column address COL_ADDR to the column address latch 250.

The bank control logic 230 may generate bank control signals in response to the bank address BANK_ADDR. One of the first to fourth bank row decoders 260a, 260b, 260c and 260d corresponding to the bank address BANK_ADDR may be activated in response to the bank control signals, and one of the first through fourth bank column decoders 270a, 270b, 270c and 270d corresponding to the bank address BANK_ADDR may be activated in response to the bank control signals.

The row address multiplexer 240 may receive the row address ROW_ADDR from the address register 220 and a refresh row address REF_ADDR from the refresh address generator 215. The refresh signal REF may be generated by control logic 210 based on an auto-refresh command provided from the memory controller 100 or may be internally generated in a self-refresh mode. The row address multiplexer 240 may selectively output the row address ROW_ADDR or the refresh row address REF_ADDR. A row address output from the row address multiplexer 240 may be applied to the first to fourth bank row decoders 260a, 260b, 260c, and 260d.

The activated one of the first through fourth bank row decoders 260a, 260b, 260c and 260d may decode the row address output from the row address multiplexer 240 to activate a word line corresponding to the row address. For example, the activated bank row decoder may apply a wordline driving voltage to the wordline corresponding to the row address.

The column address latch 250 may receive a column address from the address register 220 and temporarily store the received column address. In a burst mode, the column address latch 250 may increment the received column address. The column address latch 250 may apply the column address that is temporarily stored or incremented to the first to fourth bank column decoders 270a, 270b, 270c and 270d through the column control logic 255.

The column control logic 255 may receive a column address stored in the count address latch 250 and a count value CNT, to output a column address COL_ADDR. The count value may be size information corresponding to a read request. For example, if an input count value CNT is 1, the column control logic 255 may output a column address stored in the column address latch 250. If the count value CNT is greater than 1, the column control logic 255 may output a value obtained by adding a burst size to the value stored in the column address latch 250 as the column address COL_ADDR.

The activated one of the first to fourth bank column decoders 270a, 270b, 270c, and 270d may activate a sense amplifier corresponding to the bank address BANK_ADDR and the column address COL_ADDR through the I/O gating circuit 290.

The I/O gating circuit 290 includes circuits to gate input/output data, and also includes an input data mask logic, read data latches to store data output from the first to fourth bank memory arrays 280a, 280b, 280c, and 280d, and write drivers to write data into the first to fourth bank memory arrays 280a, 280b, 280c, and 280d.

Data DQ read from one of the first to fourth bank memory arrays 280a, 280b, 280c, and 280d may be sensed by a sense amplifier coupled to the one bank array and stored in the read data latches of the I/O gating circuit 290. The data DQ stored in the read data latches may be provided to the memory controller 100 through the data I/O buffer 295. Data DQ to be written to one of the first through fourth bank memory arrays 280a, 280b, 280c, and 280d may be provided from the memory controller 100 to the data I/O buffer 295. The data DQ provided to the data input/output buffer 295 may be written into the one bank memory array through write drivers of the I/O gating circuit 290.

The control logic 210 may control operations of the semiconductor memory device 200a. For example, the control logic 210 may generate control signals such that the semiconductor memory device 200a performs a write operation or a read operation. The control logic 210 may include a command decoder 211 that decodes a command CMD received from the memory controller 100 and a mode register 212 to set an operation mode of the semiconductor memory device 200a. For example, the command decoder 211 may generate control signals corresponding to the command CMD by decoding a write enable signal/WE, a row address strobe signal/RAS, a column address strobe signal/CAS, a chip select signal/CS, and the like. The command decoder 211 may further receive a clock signal CLK and a clock enable signal/CKE (both not shown) for operating the semiconductor memory device 200 in a synchronous manner.

In addition, the control logic 210 may control the refresh address generator 215 such that the refresh address generator 215 generates a refresh row address REF_ADDR for refresh.

The refresh address generator 215 may include a sequence table in which memory cell groups grouped according to data retention characteristics of a plurality of memory cell rows included in a memory cell array are rearranged to be stored and may generate a refresh row address REF_ADDR in the order of the rearranged memory cell groups. A refresh operation of a volatile memory device is started by generation of such a refresh row address. For example, after a power-up sequence is completed or a power-down mode is completed, a refresh operation may be started.

In example embodiments, a refresh operation may be an auto-refresh operation in which a refresh row address is generated in response to a substantially periodically applied refresh command and a memory cell row corresponding to the refresh row address is refreshed, or a self-refresh operation in which memory cell rows enter a self-refresh mode in response to a self-refresh entry command SRE and are periodically refreshed using a built-in timer in the self-refresh mode. In example embodiments, a refresh operation may be a distributed refresh operation in which refresh cycles have a predetermined refresh interval tREFI or a burst-refresh operation in which a plurality of refresh cycles are successive.

Example embodiments of inventive concepts may be applied to a key-value store. For example, the key-value store may be a memcached server. The memcached server may be a DRAM using a storage as a cache and be implemented to access a DRAM as much as a key or a value size.

Figure 6:
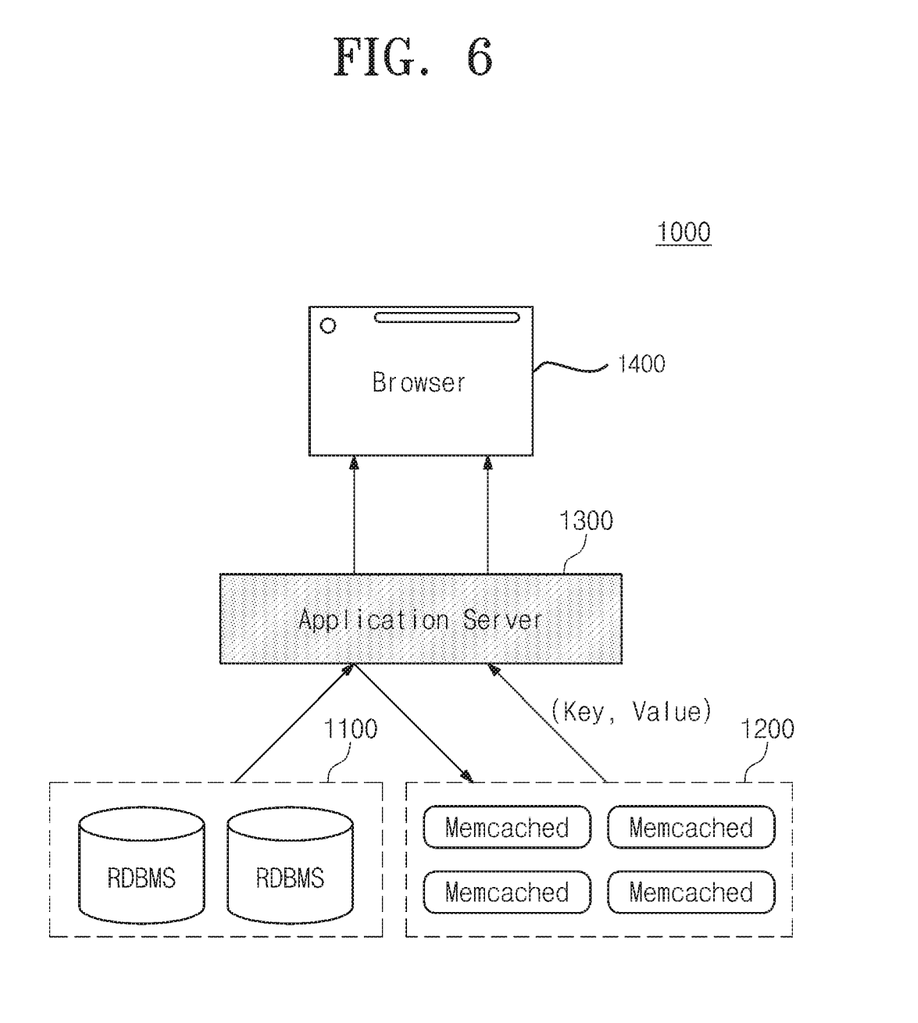
FIG. 6 illustrates a block diagram of a data server system according to example embodiments of inventive concepts.

FIG. 6 illustrates a block diagram of a data server system 1000 according to example embodiments of the inventive concepts. As illustrated, the data server system 1000 includes a database management system (RDBMS) 1100, a cache server 1200 including a plurality of memcaches, an application server 1300 and a browser 1400.

The cache server 1200 may include a key value storage to maintain and erase different key and value pairs corresponding to a notice of invalidation from the database management system 1100. The cache server 1200 may include a memory controller 100 shown in FIG. 1, a memory controller 100a shown in FIG. 2 or a memory device 200a shown in FIG. 5. The cache server 1200 may receive read requests of various sizes and manage the read requests, as described with reference to FIGS. 1 to 5, to efficiently improve the overall system performance.

A memory system according to example embodiments of inventive concepts may overcome the disadvantage that read queue size limitations prevent the overall performance of a DRAM from being fully exerted in a system where there are requests of various sizes. In addition, the overall system performance will be improved through a scheduling algorithm.

A memory system according to example embodiments of inventive concepts may include a portion to manage a queue according to an input request size and a portion to apply scheduling depending on an object. According to example embodiments of inventive concepts, a method of managing a memory request may include managing a read queue depending on a size of the input request, storing a request size in a read queue, and deciding a request size depending on a region of a queue. Storing the request size is advantageous in that it helps to easily enable coping with latency and any request size. When the request size is decided depending on the region, a size of a region is managed with several registers indicating the size of the region to minimize a queue size. On the other hand, there are two methods of generating a memory request. According to one method, a DRAM may additionally receive request size information and internally calculate an address to process a request. According to the other method, a memory request generator in a memory controller may convert a read request having a variable size into memory requests suitable for a DRAM. That is, the memory request generator may sequentially generate 64-byte memory requests and request the memory requests to the DRAM based on request size information and a start address.

In accordance with some embodiments of the inventive concepts, memory scheduling may preferentially process a high-ranked request. However, since there may be a request whose ranking continues to drop due to the scheduling, in some embodiments of the inventive concept the memory scheduling may preferentially process a request whose waiting cycle is greater than a fixed rate. The memory scheduling according to example embodiments of inventive concepts may employ an algorithm capable of processing a low-thread request. Since a specific thread is a characteristic that a specific key value has, priority may be decided based on the other requests that the specific thread or a key-value engine requests. If the number of the other requests is small, even a small number of DRAM requests may degrade the performance of a specific source. Therefore, such a request may be preferentially processed.

When regions of a key and a value are mixed, the value may be basically processed ahead of the key. Since the value is accessed based on a key after the key is read, the value may have a larger influence on the performance than the key. If information on a get command or a set command may be transmitted to a memory controller, a key of the set command may be treated to be equivalent to the value. However, the key needs to be treated later, which is helpful in improving the overall performance.

A request having a score value that satisfies a specific threshold may be processed ahead of calculation and processing of a score of the overall data. If the score satisfies the predetermined threshold, the request may be processed immediately. If there is no request that satisfies a specific condition, all scores may be compared with each other.

A memory system according to example embodiments of inventive concepts may store and manage a read queue and its size at the same time to basically store an object request in the read queue as much as depth of the read queue. Thus, DRAM parallelism may remain high and a request scheduling overhead may be reduced. Moreover, since DRAM requests managed at each queue indicate remaining requests of a specific object, an early termination request may be easily found. Thus, the memory system according to example embodiments of inventive concepts may employ a more effective scheduling algorithm.

As described above, a read request is managed through a suitable scheduling algorithm according to a size of the read request. Thus, the overall performance may be improved.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A memory system comprising:
a plurality of memory devices; and
a memory controller configured to control the plurality of memory devices,
wherein the memory controller is configured to receive a read request having a variable size, generate at least one memory request having a fixed size in response to the read request, and transmit the at least one memory request to at least one of the plurality of memory devices,
wherein the memory controller comprises a memory request generator configured to generate the at least one memory request, output a count value corresponding to a size of the read request, generate a memory address using a start address of the read request and a burst size of each of the plurality of memory devices, and determine whether the read request is a last memory request, based on the count value.

2. The memory system of claim 1, wherein the memory controller comprises a read queue configured to store the read request and the size of the read request.

3. The memory system of claim 2, wherein the memory controller further comprises a request size calculator configured to calculate the size of the read request using the fixed size.

4. The memory system of claim 2, wherein the read queue comprises a plurality of request queue units that store read requests, and
the memory controller further comprises a scheduler configured to select a read request to be processed from among the read requests stored in the plurality of request queue units.

5. The memory system of claim 4, wherein the memory request generator is further configured to generate the at least one memory request using the selected read request stored in a corresponding request queue unit from among the plurality of request queue units and a corresponding size of the selected read request.

6. The memory system of claim 1, wherein the memory request generator is configured to stop generating the memory address and generate a new memory address for a new read request under a predetermined condition.

7. A memory system comprising:
a plurality of memory devices; and
a memory controller configured to control the plurality of memory devices,
wherein the memory controller is configured to receive a read request having a variable size, generate at least one memory request having a fixed size in response to the read request, and transmit the at least one memory request to at least one of the plurality of memory devices,
wherein the memory controller comprises a read queue having a plurality of request queue units configured to store the read request, and
wherein the plurality of request queue units are divided into a plurality of regions according to a size of the read request.

8. The memory system of claim 7, wherein the plurality of request queue units comprise:
a first size region having first request queue units; and
a second size region having second request queue units, and
a size of each of the second request queue units is greater than a size of each of the first request queue units.

9. The memory system of claim 8, wherein the memory controller further comprises an address splitter configured to receive the read request and split an address of the read request into a plurality of addresses responsive to size information of the read request, and
the plurality of addresses are stored in a corresponding request queue unit from among the second request queue units.

10. The memory system of claim 7, wherein the memory controller further comprises a request size calculator configured to receive the read request and calculate the size of the read request using the fixed size.

11. The memory system of claim 7, wherein the memory controller further comprises a scheduler configured to decide a read request to be processed from among read requests stored in the plurality of request queue units, and the scheduler is configured to decide the read request to be processed according to a score value accumulated in each of the plurality of request queue units.

12. The memory system of claim 11, wherein the scheduler is configured to select a corresponding request queue unit from among the plurality of request queue units when the score value is greater than a predetermined value, and using a waiting time of each of the plurality of request queue units.

13. The memory system of claim 11, wherein the memory system is a key-value store, and
the scheduler is configured to decide priority according to a key and a value, and select a request queue unit from among the plurality of request queue units using the decided priority and a size of the plurality of request queue units.

14. A memory controller comprising:
a request size calculator configured to receive read requests and calculate a size of the read requests;
a read queue comprising a plurality of request queue units configured to store the read requests;
a scheduler configured to read information on the stored read requests from the read queue and select a processing sequence of the plurality of request queue units based on the read information; and
a memory request generator configured to generate at least one memory request to a memory responsive to the processing sequence of the plurality of request queue units,
wherein the plurality of request queue units comprise first request queue units configured to store read requests of a first size, and second request queue units configured to store read requests of a second size greater than the first size.

15. The memory controller of claim 14, wherein the read requests comprise a start address,
the memory controller further comprising an address splitter configured to split a single read request of the read requests into first and second split read requests, and to store a start address of the first split read request in one of the first request queue units and a start address of the second split read request in one of the second request queue units.

16. The memory controller of claim 14, wherein the request size calculator is further configured to store the size of the read requests in the request queue units.

* * * * *